(12) United States Patent
Choi et al.

(10) Patent No.: US 12,512,932 B2
(45) Date of Patent: Dec. 30, 2025

(54) DYNAMIC RECEIVER CHAIN ALLOCATION

(71) Applicant: QUALCOMM Incorporated, San Diego, CA (US)

(72) Inventors: Zae Yong Choi, San Jose, CA (US); Peter Pui Lok Ang, San Diego, CA (US); Ruhua He, San Diego, CA (US); Yash Pathak, Erie, CO (US); Yuanning Yu, Santa Clara, CA (US); Chitaranjan Pelur Sukumar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 18/074,365

(22) Filed: Dec. 2, 2022

(65) Prior Publication Data

US 2024/0187149 A1   Jun. 6, 2024

(51) Int. Cl.
*H04L 5/00* (2006.01)
*H04L 1/00* (2006.01)

(52) U.S. Cl.
CPC ............ *H04L 5/001* (2013.01); *H04L 1/0003* (2013.01)

(58) Field of Classification Search
CPC ................................ H04W 24/02; H04L 5/001
See application file for complete search history.

(56) References Cited

U.S. PATENT DOCUMENTS

| | | |
|---|---|---|
| 2015/0271755 A1 | 9/2015 | Karri et al. |
| 2019/0166603 A1* | 5/2019 | Wang .................... H04B 7/0868 |
| 2019/0166608 A1 | 5/2019 | Kumar et al. |
| 2020/0145947 A1* | 5/2020 | Gheorghiu ........... H04B 17/336 |
| 2024/0049007 A1* | 2/2024 | Zhang ................... H04W 24/02 |

FOREIGN PATENT DOCUMENTS

| | | | | |
|---|---|---|---|---|
| WO | WO-2015176934 A1 | * | 11/2015 | .......... H04L 5/0035 |
| WO | 2018191935 A1 | | 10/2018 | |

OTHER PUBLICATIONS

International Search Report and Written Opinion—PCT/US2023/076711—ISA/EPO—May 31, 2024.
Partial International Search Report—PCT/US2023/076711—ISA/EPO—Feb. 15, 2024.

* cited by examiner

*Primary Examiner* — Kevin C. Harper
(74) *Attorney, Agent, or Firm* — Kevin M. Donnelly; Seyfarth Shaw LLP

(57) ABSTRACT

A method for wireless communication by a user equipment (UE) includes receiving, from a network node, a message configuring a group of component carriers (CCs). The method also includes allocating, to each CC of the group of CCs based on receiving the message configuring the group of CCs, one of a respective first number of receiver chains, from a group of receiver chains available at the UE, or a respective second number of receiver chains, from the group of receiver chains, to maximize a total number of receiver chains for decoding the group of CCs, collectively. The method further includes decoding each CC of the group of CCs based on the respective first number of receiver chains or the respective second number of receiver chains allocated to the CC.

28 Claims, 9 Drawing Sheets

700 ⟶

702 — Receive, from a network node, a message configuring a group of component carriers (CCs);

704 — Allocate, to each CC of the group of CCs based on receiving the message configuring the group of CCs, one of a respective first number of receiver chains, from a group of receiver chains available at the UE, or a respective second number of receiver chains, from the group of receiver chains, to maximize a total number of receiver chains actively used for decoding the group of CCs, collectively 706 — Decode each CC of the group of CCs based on the respective first number of receiver chains or the respective second number of receiver chains allocated to the CC

902 — Detect an event associated with a wireless communication channel

904 — Allocate, in response to detecting the event, a respective first number of receiver chains from a group of receiver chains available at the UE to each component carrier (CC) of a first subset of CCs, of a group of CCs, currently associated with a respective second number of receiver chains from the group of receiver chains, and a respective second number of receiver chains from the group of receiver chains to each CC of a second subset of CCs, of the group of CCs, currently associated with a respective first number of receiver chains from the group of receiver chains, based on a throughput gain associated with switching each CC of the first subset of CCs to the respective first number of receiver chains being greater than a throughput loss associated with switching each CC of the second subset of CCs to the respective second number of receiver chains 906 — Decode each CC of the group of CCs based on the respective first number of receiver chains or the respective second number of receiver chains allocated to the CC

*FIG. 9*

DYNAMIC RECEIVER CHAIN ALLOCATION

FIELD OF THE DISCLOSURE

The present disclosure relates generally to wireless communications, and more specifically to dynamically allocating receiver chains available at a wireless communication device.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IOT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, or a 6G Node B.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

A UE may include a group of receiver chains for receiving communications via one or more communication bands. In some examples, a UE may decode a group of component carriers (CCs) configured in one or more of the communication bands. In some such examples, based on availability of radio frequency (RF) resources and demodulation capabilities (for example, an analog-to-digital converter (ADC) sampling rate and a decoding sampling rate), a UE may not be able to use a maximum number of receiver chains supported by the UE to decode each CC of the group of CCs.

SUMMARY

In one aspect of the present disclosure, a method for wireless communication includes receiving, from a network node, a message configuring a group of component carriers (CCs). The method further includes allocating, to each CC of the group of CCs based on receiving the message configuring the group of CCs, one of a respective first number of receiver chains, from a group of receiver chains available at the UE, or a respective second number of receiver chains, from the group of receiver chains, to maximize a total number of receiver chains actively used for decoding the group of CCs, collectively. The method still further includes decoding each CC of the group of CCs based on the respective first number of receiver chains or the respective second number of receiver chains allocated to the CC.

Another aspect of the present disclosure is directed to an apparatus including means for receiving, from a network node, a message configuring a group of CCs. The apparatus further includes means for allocating, to each CC of the group of CCs based on receiving the message configuring the group of CCs, one of a respective first number of receiver chains, from a group of receiver chains available at the UE, or a respective second number of receiver chains, from the group of receiver chains, to maximize a total number of receiver chains actively used for decoding the group of CCs, collectively. The apparatus still further includes means for decoding each CC of the group of CCs based on the respective first number of receiver chains or the respective second number of receiver chains allocated to the CC.

In another aspect of the present disclosure, a non-transitory computer-readable medium with non-transitory program code recorded thereon is disclosed. The program code is executed by a processor and includes program code to receive from a network node, a message configuring a group of CCs. The program code further includes program code to allocate, to each CC of the group of CCs based on receiving the message configuring the group of CCs, one of a respective first number of receiver chains, from a group of receiver chains available at the UE, or a respective second number of receiver chains, from the group of receiver chains, to maximize a total number of receiver chains actively used for decoding the group of CCs, collectively. The program code still further includes program code to decode each CC of the group of CCs based on the respective first number of receiver chains or the respective second number of receiver chains allocated to the CC.

Another aspect of the present disclosure is directed to an apparatus having a processor, and a memory coupled with the processor and storing instructions operable, when executed by the processor, to cause the apparatus to receive, from a network node, a message configuring a group of CCs. Execution of the instructions further cause the apparatus to allocate, to each CC of the group of CCs based on receiving the message configuring the group of CCs, one of a respective first number of receiver chains, from a group of receiver chains available at the UE, or a respective second number of receiver chains, from the group of receiver chains, to maximize a total number of receiver chains actively used for decoding the group of CCs, collectively. Execution of the instructions also cause the apparatus to decode each CC of the group of CCs based on the respective first number of receiver chains or the respective second number of receiver chains allocated to the CC.

In one aspect of the present disclosure, a method for wireless communication includes detecting an event associated with a wireless communication channel. The method also include allocating, to each CC of a group of CCs based on detecting the event, one of a respective first number of receiver chains, from a group of receiver chains available at the UE, or a respective second number of receiver chains, from the group of receiver chains, to maximize a total throughput for decoding the group of CCs collectively. The method further includes decoding each CC of the group of CCs based on the respective first amount of receiver chains or the respective second amount of receiver chains allocated to the CC.

Another aspect of the present disclosure is directed to an apparatus including means for detecting an event associated with a wireless communication channel. The apparatus also includes means for allocating, to each CC of a group of CCs based on detecting the event, one of a respective first number of receiver chains, from a group of receiver chains available at the UE, or a respective second number of receiver chains, from the group of receiver chains, to maximize a total throughput for decoding the group of CCs collectively. The apparatus further includes means for decoding each CC of the group of CCs based on the respective first amount of receiver chains or the respective second amount of receiver chains allocated to the CC.

In another aspect of the present disclosure, a non-transitory computer-readable medium with non-transitory program code recorded thereon is disclosed. The program code is executed by a processor and includes program code to detect an event associated with a wireless communication channel. The program code also includes program code to allocate, to each CC of a group of CCs based on detecting the event, one of a respective first number of receiver chains, from a group of receiver chains available at the UE, or a respective second number of receiver chains, from the group of receiver chains, to maximize a total throughput for decoding the group of CCs collectively. The program code further includes program code to decode each CC of the group of CCs based on the respective first amount of receiver chains or the respective second amount of receiver chains allocated to the CC.

Another aspect of the present disclosure is directed to an apparatus having a processor, and a memory coupled with the processor and storing instructions operable, when executed by the processor, to cause the apparatus to detect an event associated with a wireless communication channel. Execution of the instructions also cause the apparatus to allocate, to each CC of a group of CCs based on detecting the event, one of a respective first number of receiver chains, from a group of receiver chains available at the UE, or a respective second number of receiver chains, from the group of receiver chains, to maximize a total throughput for decoding the group of CCs collectively. Execution of the instructions also cause the apparatus to decode each CC of the group of CCs based on the respective first amount of receiver chains or the respective second amount of receiver chains allocated to the CC.

In one aspect of the present disclosure, a method for wireless communication includes detecting an event associated with a wireless communication channel. The method also includes allocating, in response to detecting the event, a respective first number of receiver chains from a group of receiver chains available at the UE to each CC of a first subset of CCs, of a group of CCs, currently associated with a respective second number of receiver chains from the group of receiver chains, and a respective second number of receiver chains from the group of receiver chains to each CC of a second subset of CCs, of the group of CCs, currently associated with a respective first number of receiver chains from the group of receiver chains, based on a throughput gain associated with switching each CC of the first subset of CCs to the respective first number of receiver chains being greater than a throughput loss associated with switching each CC of the second subset of CCs to the respective second number of receiver chains. The method further includes decoding each CC of the group of CCs based on the respective first number of receiver chains or the respective second number of receiver chains allocated to the CC.

Another aspect of the present disclosure is directed to an apparatus including means for detecting an event associated with a wireless communication channel. The apparatus also includes means for allocating, in response to detecting the event, a respective first number of receiver chains from a group of receiver chains available at the UE to each CC of a first subset of CCs, of a group of CCs, currently associated with a respective second number of receiver chains from the group of receiver chains, and a respective second number of receiver chains from the group of receiver chains to each CC of a second subset of CCs, of the group of CCs, currently associated with a respective first number of receiver chains from the group of receiver chains, based on a throughput gain associated with switching each CC of the first subset of CCs to the respective first number of receiver chains being greater than a throughput loss associated with switching each CC of the second subset of CCs to the respective second number of receiver chains. The apparatus further includes means for decoding each CC of the group of CCs based on the respective first number of receiver chains or the respective second number of receiver chains allocated to the CC.

In another aspect of the present disclosure, a non-transitory computer-readable medium with non-transitory program code recorded thereon is disclosed. The program code is executed by a processor and includes program code to detect an event associated with a wireless communication channel. The program code also includes program code to allocate, in response to detecting the event, allocate a respective first number of receiver chains from a group of receiver chains available at the UE to each CC of a first subset of CCs, of a group of CCs, currently associated with a respective second number of receiver chains from the group of receiver chains, and a respective second number of receiver chains from the group of receiver chains to each CC of a second subset of CCs, of the group of CCs, currently associated with a respective first number of receiver chains from the group of receiver chains, based on a throughput gain associated with switching each CC of the first subset of CCs to the respective first number of receiver chains being greater than a throughput loss associated with switching each CC of the second subset of CCs to the respective second number of receiver chains. The program code further includes program code to decode each CC of the group of CCs based on the respective first number of receiver chains or the respective second number of receiver chains allocated to the CC.

Another aspect of the present disclosure is directed to an apparatus having a processor, and a memory coupled with the processor and storing instructions operable, when executed by the processor, to cause the apparatus to detect an event associated with a wireless communication channel.

Execution of the instructions also cause the apparatus to allocate, in response to detecting the event, allocate a respective first number of receiver chains from a group of receiver chains available at the UE to each CC of a first subset of CCs, of a group of CCs, currently associated with a respective second number of receiver chains from the group of receiver chains, and a respective second number of receiver chains from the group of receiver chains to each CC of a second subset of CCs, of the group of CCs, currently associated with a respective first number of receiver chains from the group of receiver chains, based on a throughput gain associated with switching each CC of the first subset of CCs to the respective first number of receiver chains being greater than a throughput loss associated with switching each CC of the second subset of CCs to the respective second number of receiver chains. Execution of the instructions also cause the apparatus to decode each CC of the group of CCs based on the respective first number of receiver chains or the respective second number of receiver chains allocated to the CC.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 7 is a flow diagram illustrating an example process performed by a UE that supports dynamically allocating receiver chains, in accordance with some aspects of the present disclosure.

FIG. 9 is a flow diagram illustrating an example process performed by a UE that supports dynamically allocating receiver chains, in accordance with some aspects of the present disclosure

DETAILED DESCRIPTION

Figure 1:
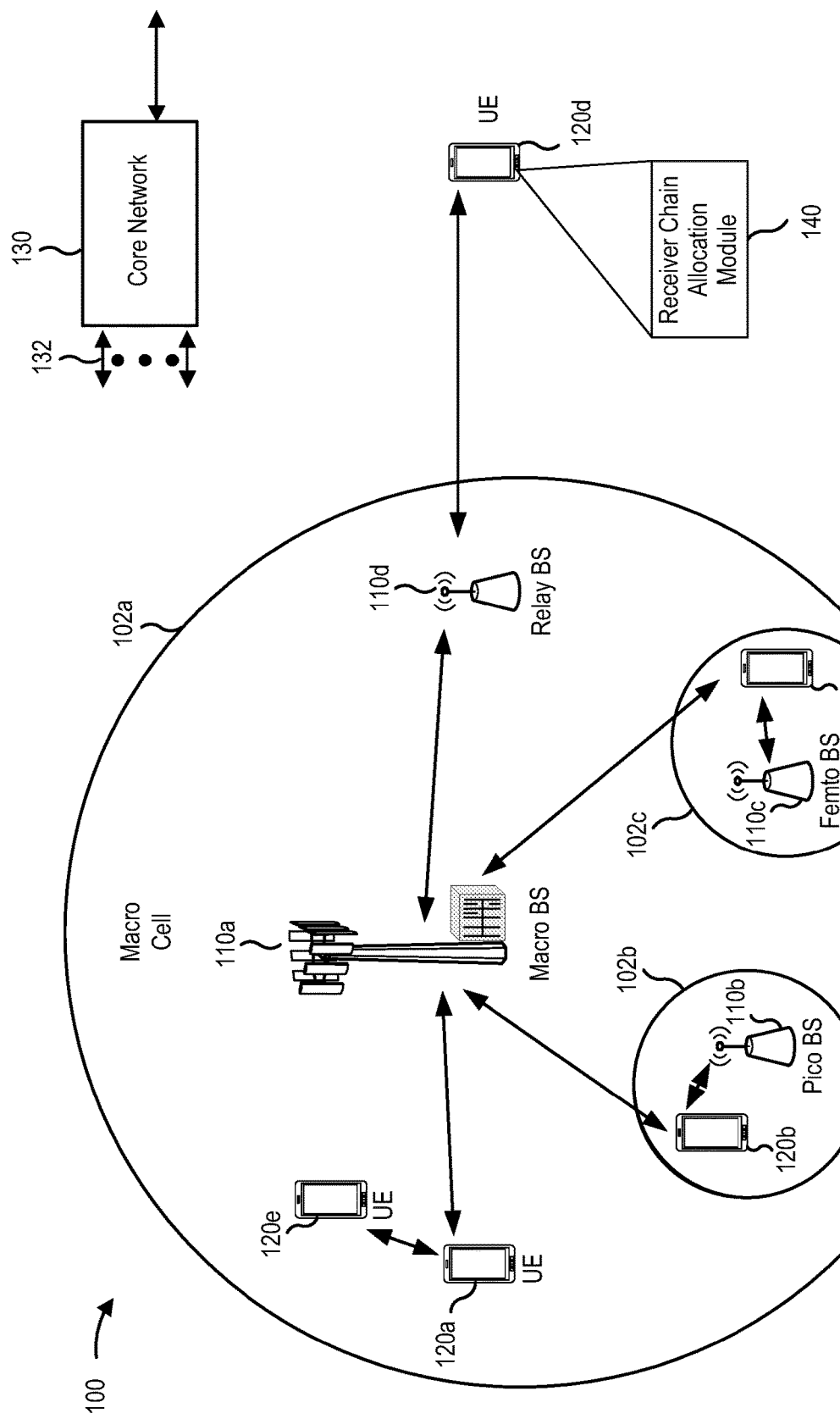
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G or 4G technologies.

A user equipment (UE) may include a group of receiver chains for communicating via one or more communication bands. In some examples, a UE may communicate with a network node via a group of component carriers (CCs) within one or more of the communication bands. In some such examples, based on a total number of available receiver chains of a group of receiver chains at the UE, and demodulation capabilities (for example, an analog-to-digital converter (ADC) sampling rate and a decoding sampling rate), the UE may not be able to use a maximum number of receiver chains, from the group of receiver chains, to decode each CC of the group of CCs. A receiver chain may be an example of a reception resource. Each receiver chain may include an antenna, a radio frequency (RF)/analog amplifier, a mixer, an RF/analog filter, an ADC, a down converter, a digital processor, and/or a digital demodulator. Because the maximum number of receiver chains may not be allocated to each CC of the group of CCs, some conventional systems may allocate a minimum number of receiver chains to each CC of the group of CCs. However, allocating the minimum number of receiver chains may reduce network throughput.

Various aspects disclosed relate generally to dynamically allocating a number of chains, of a group of chains available at the UE, to each CC of a group of configured CCs. Some aspects more specifically relate to dynamically allocating a number of receiver chains (or combined transmit/receive chains) to each CC of the group of CCs to maximize a total number of receiver chains actively used for decoding the group of CCs, collectively. In some examples, a UE may receive, from a network node (or "entity"), a message configuring the group of CCs. In some such examples, the UE may activate or deactivate one or more CCs of the group of CCs based on receiving the message configuring the group of CCs. In other such examples, the UE may re-configure the group of CCs based on receiving the message configuring the group of CCs. In some examples, responsive to receiving the message configuring the group of CCs, the UE may allocate, to each CC of the group of CCs, one of a respective first number of receiver chains or a respective second number of receiver chains, of the group of receiver chains, to maximize total number of receiver chains actively used for decoding the group of CCs, collectively. Because each receiver chain includes an antenna, a radio frequency (RF)/analog amplifier, a mixer, an RF/analog filter, an ADC, a down converter, a digital processor, and/or a digital demodulator, maximizing the total number of receiver chains actively used for decoding the group of CCs collectively may be an example of maximizing actively used receiver resources to maximize an amount of bandwidth that is decoded given the UE's decoding capabilities. In some examples, the first number of receiver chains is a minimum number of receiver chains required to decode the respective CC. In such examples, the second number of receiver chains may be a maximum number of receiver chains that may be utilized to decode the respective CC. The UE may then decode each CC of the group of CCs based on the respective first number of receiver chains or the respective second number of receiver chains allocated to the CC.

Some other aspects more specifically relate to dynamically allocating a number of receiver chains, of a group of receiver chains available at a UE, to each CC of a group of configured CCs to increase a total throughput associated with decoding the group of CCs, collectively. In some examples, the UE may dynamically allocate, to each CC of the group of CCs, one of a respective first number of receiver chains, of the group of receiver chains, or a respective second number of receiver chains, of the group of receiver chains, to maximize the total throughput associated with decoding the group of CCs, collectively. In such examples, the UE may dynamically allocate to each CC of the group of CCs, one of a respective first number of receiver chains, of the group of receiver chains, or a respective second number of receiver chains, of the group of receiver chains based on an event associated with a wireless communication channel, such as a change in a traffic pattern and/or a change in a channel condition. In some examples, the first number of receiver chains is a minimum number of receiver chains required to decode the respective CC. In such examples, the second number of receiver chains may be a maximum number of receiver chains that may be utilized to decode the respective CC. The UE may then decode each CC of the group of CCs based on the respective first number of receiver chains or the respective second number of receiver chains allocated to the CC.

In some other examples, a UE may dynamically allocate a respective first number of receiver chains, of a group of receiver chains available at the UE, to each CC of a first subset of CCs, of a group of configured CCs, wherein each CC of a first subset of CCs is currently associated with a respective second number of receiver chains. Additionally, in such examples, the UE may allocate a respective second number of receiver chains, of the group of receiver chains, to each CC of a second subset of CCs, of the group of CCs, wherein each CC of the second subset of CCs is currently associated with a respective first number of receiver chains, of the group of receiver chains. In such examples, the UE may dynamically allocate the respective first number of receiver chains and the respective second number of receiver chains based on an event associated with a wireless communication channel, such as a change in a traffic pattern and/or a change in a channel condition. The UE may allocate the respective first number of receiver chains and the respective second number of receiver chains to each of the CCs based on a throughput gain being greater than a throughput loss. The throughput gain is associated with switching each CC of the first subset of CCs to the respective first number of receiver chains. The throughput loss is associated with switching each CC of the second subset of CCs to the respective second number of receiver chains. In some examples, the first number of receiver chains is a minimum number of receiver chains required to decode the respective CC. In such examples, the second number of receiver chains may be a maximum number of receiver chains that may be utilized to decode the respective CC. The UE may then decode each CC of the group of CCs based on the respective first number of receiver chains or the respective second number of receiver chains allocated to the CC.

Particular aspects of the subject matter described in this disclosure can be implemented to realize one or more of the following potential advantages. In some examples, by allocating, to each CC of a group of CCs, one of a respective first number of receiver chains or a respective second number of receiver chains to maximize a total number of receiver chains actively used for decoding the group of CCs, collectively, a wireless communication device may increase resource utilization at the UE. Increasing resource utilization may increase the decoding throughput. Increasing the decoding throughput may increase the overall network communication throughput. Additionally, in some other examples, by allocating, to each CC of the group of CCs, one of a respective first number of receiver chains or a respective second number of receiver chains to maximize a total throughput for decoding the group of CCs, collectively, a wireless communication device may increase network throughput and reduce latency.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G Node B, an access point, a transmit and receive point (TRP), a network node, a network entity, or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC.

Each BS may provide communications coverage for a particular geographic area. In 3GPP, the term "cell" can refer to a coverage area of a BS or a BS subsystem serving this coverage area, depending on the context in which the term is used.

A BS may provide communications coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "AP," "Node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another or to one or more other BSs or network nodes (not shown) in the wireless network 100 through various types of backhaul interfaces such as a direct physical connection, a virtual network, or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, or the like.

The wireless network 100 may be a heterogeneous network that includes BSs of different types (for example, macro BSs, pico BSs, femto BSs, relay BSs, or the like). These different types of BSs may have different transmit power levels, different coverage areas, and different impact on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a receiver chain allocation module 140. For brevity, only one UE 120d is shown as including the receiver chain allocation module 140. The receiver chain allocation module 140 may perform various operations, including operations of the processes 700, 800, and 900 described below with reference to FIGS. 7, 8, and 9, respectively.

Some UEs may be considered machine-type communications (MTC) or evolved or enhanced machine-type communications (eMTC) UEs. MTC and eMTC UEs include, for example, robots, drones, remote devices, sensors, meters, monitors, location tags, or the like, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IOT) devices, or may be implemented as NB-IOT (narrowband internet of things) devices. Some UEs may be considered a customer premises equipment (CPE). UE 120 may be included inside a housing that houses components of UE 120, such as processor components, memory components, or the like.

In general, any number of wireless networks may be deployed in a given geographic area. Each wireless network may support a particular radio access technology (RAT) and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like), a mesh network, or the like. In this case, the UE 120 may perform scheduling operations, resource selection operations, or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

As indicated above, FIG. 1 is provided merely as an example. Other examples may differ from what is described with regard to FIG. 1.

Figure 2:
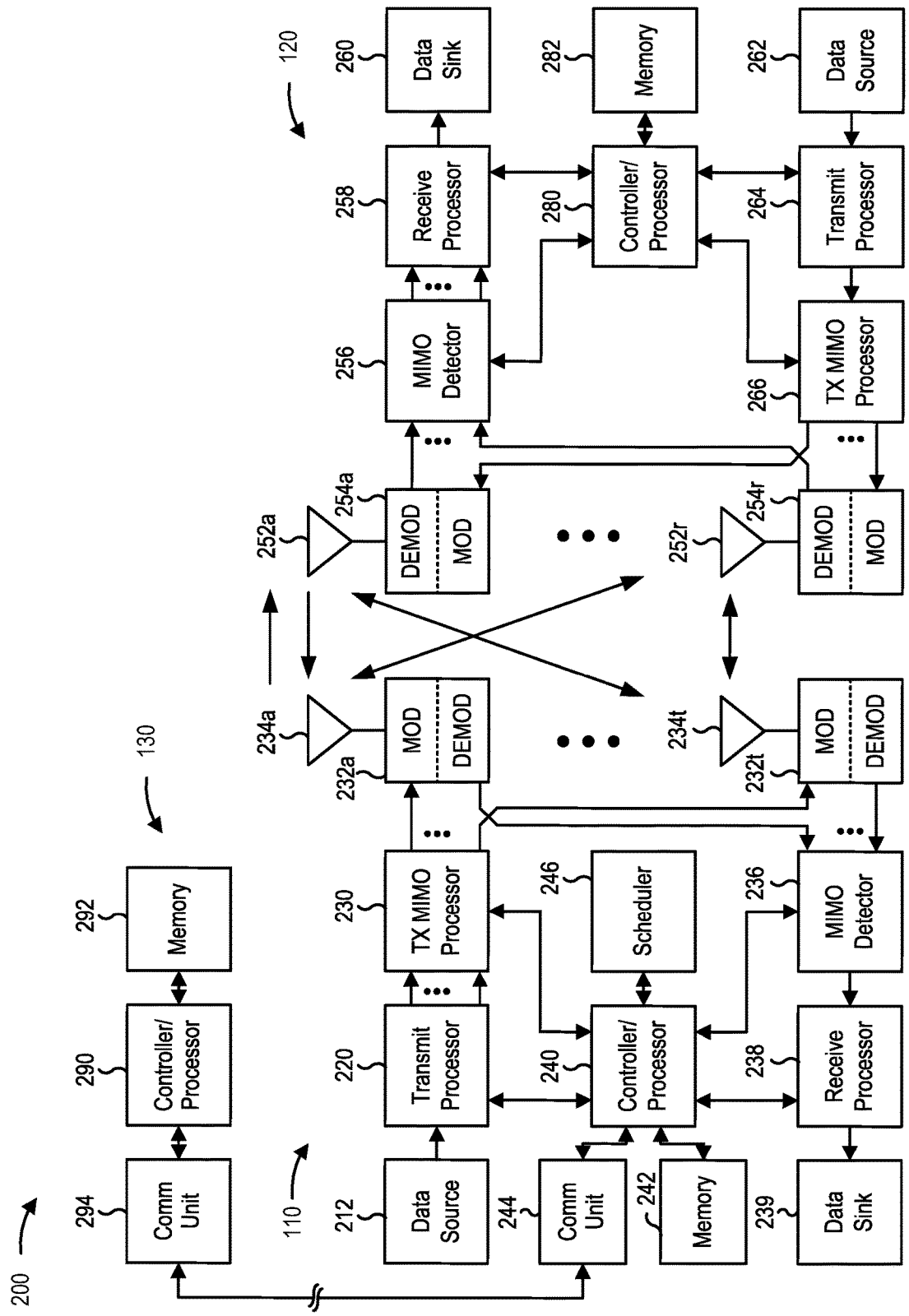
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs 120, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) or the like) and control information (for example, CQI requests, grants, upper layer signaling, or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232*a* through 232*t*. Each modulator 232 may process a respective output symbol stream (for example, for orthogonal frequency division multiplexing (OFDM) or the like) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM or the like) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (for example, for discrete Fourier transform spread OFDM (DFT-s-OFDM), CP-OFDM, or the like), and transmitted to the base station 110. At the base station 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include a communications unit 244 and communicate to the core network 130 via the communications unit 244. The core network 130 may include a communications unit 294, a controller/processor 290, and a memory 292.

One or more of the controller/processor 240 of the base station 110, the controller/processor 280 of the UE 120, or any other component(s) of FIG. 2 may perform one or more techniques associated with dynamically allocating receiver chains as described in more detail elsewhere. For example, one or more of the controller/processor 240 of the base station 110, the controller/processor 280 of the UE 120, or any other component(s) of FIG. 2 may perform or direct operations of, for example, one or more of the processes of FIGS. 7, 8, and 9, or other processes as described. Memories 242 and 282 may store data and program codes for the base station 110 and UE 120, respectively. A scheduler 246 may schedule UEs for data transmission on the downlink or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some cases, different types of devices supporting different types of applications or services may coexist in a cell. Examples of different types of devices include UE handsets, customer premises equipment (CPEs), vehicles, Internet of Things (IOT) devices, or the like. Examples of different types of applications include ultra-reliable low-latency communications (URLLC) applications, massive machine-type communications (mMTC) applications, enhanced mobile broadband (eMBB) applications, vehicle-to-anything (V2X) applications, or the like. Furthermore, in some cases, a single device may support different applications or services simultaneously.

Figure 3:
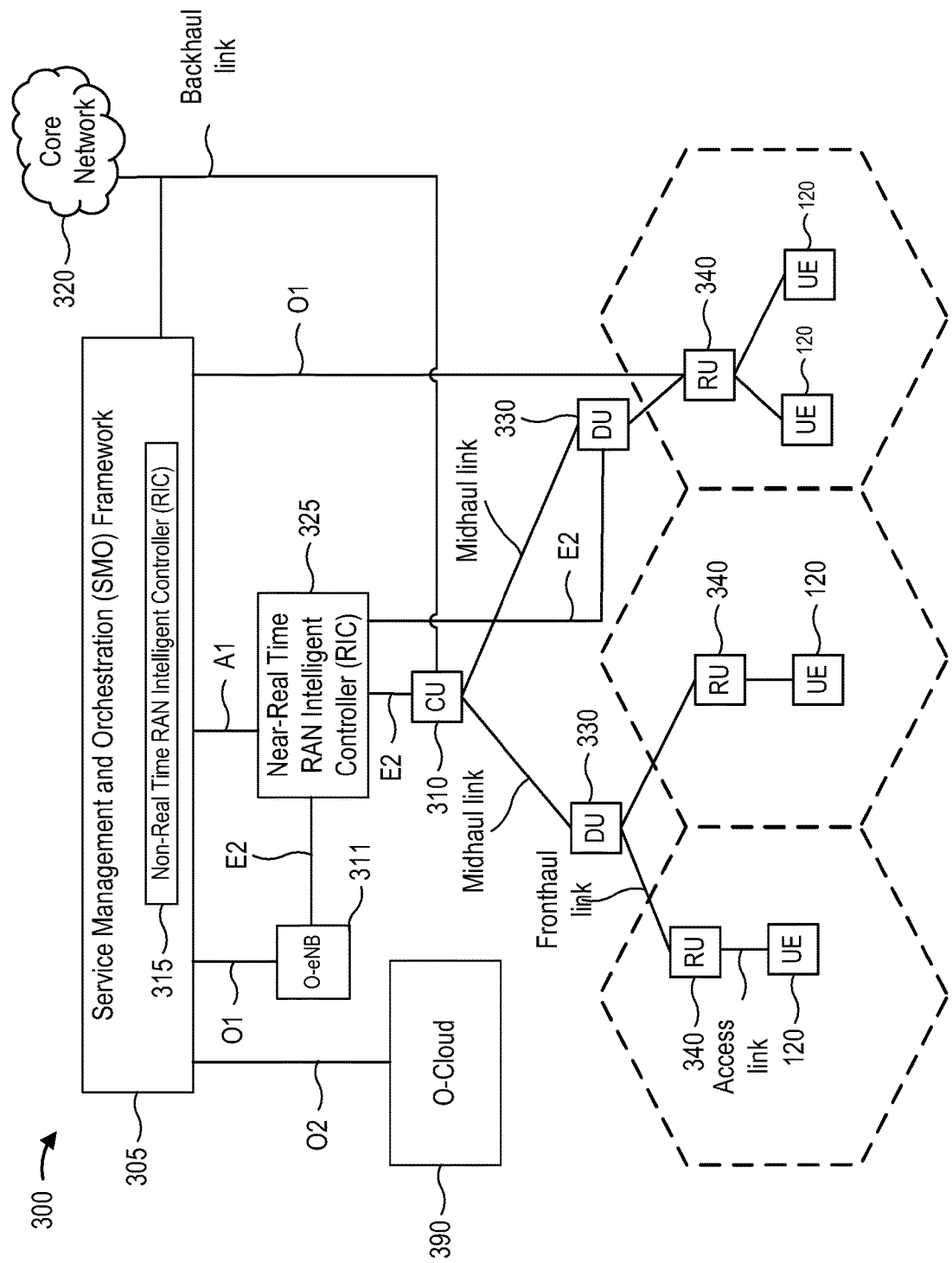
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (for example, the CUS 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit-user plane (CU-UP)), control plane functionality (for example, central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO framework 305 may be configured to support RAN deployment and provisioning of non-virtualized and virtualized network elements. For non-virtualized network elements, the SMO framework 305 may be configured to support the deployment of dedicated physical resources for RAN coverage requirements, which may be managed via an operations and maintenance interface (such as an O1 interface). For virtualized network elements, the SMO framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO framework 305 can communicate with a hardware aspect of a 4G RAN, such as an open eNB (O-eNB) 311, via an O1 interface. Additionally, in some implementations, the SMO framework 305 can communicate directly with one or more RUs 340 via an O1 interface. The SMO framework 305 also may include a non-RT RIC 315 configured to support functionality of the SMO framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO framework 305 (such as reconfiguration via O1) or via creation of RAN management policies (such as A1 policies).

As discussed, a UE may include a group of receiver chains for a communication band. In some examples, a UE may decode a group of CCs. In some such examples, based on availability of RF resources and demodulation capabilities (for example, an ADC sampling rate and a decoding sampling rate), a UE may not be able to use a maximum number of receiver chains, from the group of receiver chains, to decode each CC of the group of CCs. Because the maximum number of receiver chains may not be allocated to each CC of the group of CCs, some conventional systems may allocate a minimum number of receiver chains to each CC. Allocating the minimum number of receiver chains may reduce network throughput.

Various aspects disclosed relate generally to dynamically allocating a number of receiver chains to each CC of a group of CCs. Some aspects more specifically relate to dynamically allocating a number of receiver chains to each CC of the group of CCs to maximize a total number of receiver chains actively used for decoding the group of CCs collectively. In some examples, a UE may receive, from a network node, a message configuring a group of CCs. In some such examples, the UE may activate or deactivate one or more CCs based on receiving the message configuring the group of CCs. In other such examples, the UE may re-configure the group of CCs based on receiving the message configuring the group of CCs. Re-configuring the group of CCs may include, for example, moving one or more CCs from a first band to a second band.

In some examples, based on receiving the message configuring the group of CCs, the UE may allocate to each CC, one of a respective first number of receiver chains or respective second number of receiver chains to maximize a total number of receiver chains actively used for decoding the group of CCs, collectively. In some examples, the UE may then decode each CC based on the respective first number of receiver chains or the respective second number of receiver chains allocated to the CC. In some such examples, prior to allocating one of the respective first number of receiver chains or the respective second number of receiver chains, the UE may determine for each CC based on receiving the message, a first amount of reception resources, from a group of reception resources available at the UE, for decoding the CC with the respective first number of receiver chains. The UE may also determine a second amount of reception resources for decoding the CC with the second number of receiver chains.

The UE may select the first number of receiver chains and the second number of receiver chains from a group of receiver chains associated with the UE. Additionally, the first number of receiver chains may be different than the second number of receiver chains. In some examples, the first number of receiver chains may be a minimum number of receiver chains specified for decoding the CC, and the second number of receiver chains may be a maximum number of receiver chains specified for decoding the CC. The first amount of reception resources and the second amount of reception resources may be from a group of reception resources available at the UE.

Figure 4:
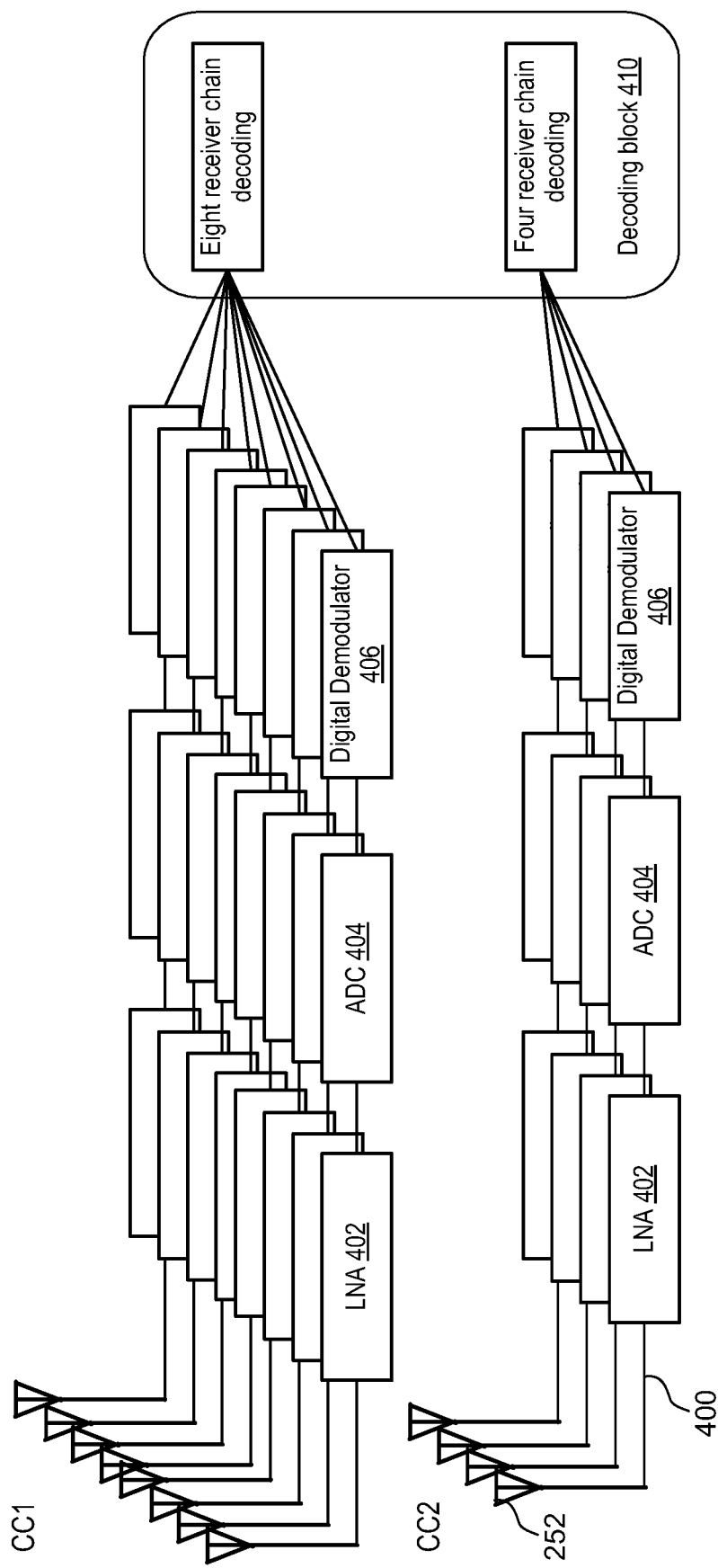
FIGS. 4 and 5 are block diagrams illustrating examples of allocating receiver chains, in accordance with various aspects of the present disclosure.

FIG. 4 is a block diagram illustrating an example of allocating receiver chains, in accordance with various aspects of the present disclosure. In the example of FIG. 4, a UE 120 may be configured with a first CC (CC1) having a 100 Mhz bandwidth and a second CC (CC2) having a 60 MHz bandwidth. Additionally, in the example of FIG. 4, twelve receiver chains 400 (for example, group of receiver chains 400) may be available at the UE 120. Aspects of the present disclosure are not limited to the UE 120 supporting twelve receiver chains 400. Additional or fewer receiver chains may be supported. For brevity, only one receiver chain 400 is labeled in the example of FIG. 4. A first number of receiver chains, from the twelve receiver chains 400, may be allocated to the first CC, and a second number of receiver chains, from the twelve receiver chains 400, may be allocated to the second CC. Each receiver chain is a hard-wired receiver chain or a time-shared digital processing receiver chain. Additionally, each receiver chain may be associated with one or more antennas 252, a low-noise amplifier (LNA) 402 (for example, downconverter), an analog-to-digital converter (ADC) 404 (for example, digital processor), and a digital demodulator 406.

In the example of FIG. 4, for each CC (CC1 and CC2), the UE 120 may determine a first amount of reception resources, from a group of reception resources available at the UE 120, for decoding the CC with the first number of receiver chains. The UE 120 may also determine a second amount of reception resources for decoding the CC with the second number of receiver chains. The reception resources may be resources used by the receiver chains for decoding each CC. In some examples, the reception resources may include resources used by one or more of the LNA 402, the ADC 404, or the digital demodulator 406.

In the example of FIG. 4, the UE 120 may allocate, to each CC of the group of CCs (CC1 and CC2), one of a respective first number of receiver chains or respective second number of receiver chains to maximize a total number of receiver chains actively used for decoding the group of CCs, collectively. In the example of FIG. 4, the UE 120 allocates eight receiver chains to the first CC and four receiver chains to the second CC. The UE 120 may decode, at a decoding block 410, each CC of the group of CCs (CC1 and CC2) based on the first number of receiver chains or the second number of receiver chains allocated to the CC.

Some aspects relate to dynamically allocating a number of receiver chains to each CC to increase a total throughput associated with decoding the group of CCs, collectively. In such aspects, the UE may dynamically allocating a number of receiver chains to each CC based on an event associated with a wireless communication channel. As an example, the event may be a change in a traffic pattern associated with the wireless communication channel and/or a change in a channel condition associated with the wireless communication channel. In some examples, the UE 120 may allocate, to each CC of the group of CCs, one of a first number of receiver chains or a second number of receiver chains to maximize the total throughput associated with decoding the group of CCs, collectively. In some examples, a throughput associated with a CC may change by allocating at least one additional receiver chain to the CC. The UE 120 may then decode each CC of the group of CCs based on the first number of receiver chains or the second number of receiver chains allocated to the CC. Each of the first number of receiver chains and the second number of receiver chains may be selected from a group of receiver chains associated with the UE 120. Additionally, the first number of receiver chains may be different than the second number of receiver chains. Furthermore, each receiver chain is a hard-wired receiver chain or a time-shared digital processing receiver chain.

In such examples, the UE 120 may determine, for each of the CCs, a first throughput associated with decoding the CC using the first number of receiver chains from the group of UE receiver chains, and a second throughput associated with decoding the CC using the second number of UE receiver chains. The first throughput and the second throughput may be based on one or both of a current amount of network traffic or current channel conditions. The current amount of network traffic may be based on one or more of a modulation and coding scheme (MCS), slot allocation, or another type of network traffic measurement. Additionally, the current channel conditions may be based on one or more of a signal-to-noise ratio, a reference signal measurement, or another type of channel condition measurement.

Figure 5:
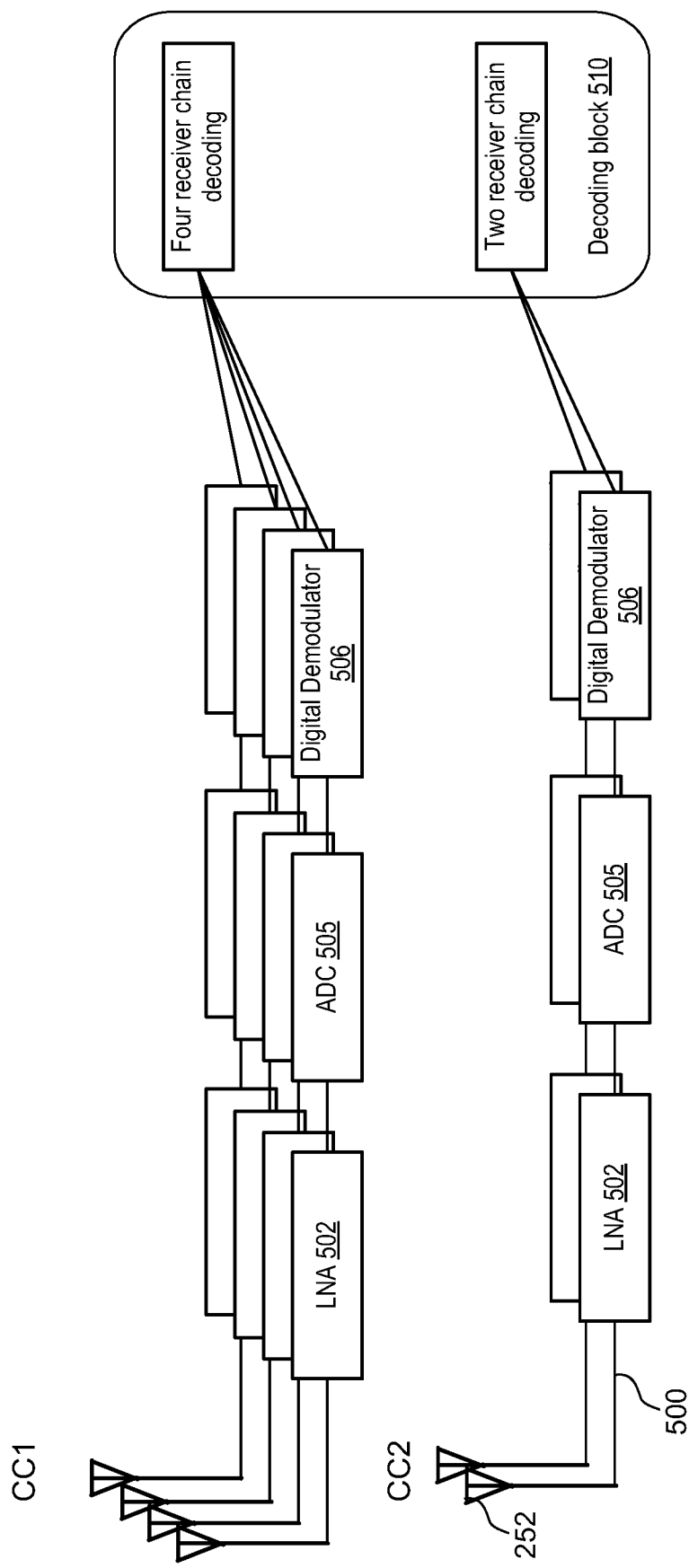

FIG. 5 is a block diagram illustrating an example of allocating receiver chains, in accordance with various aspects of the present disclosure. In the example of FIG. 5, a UE 120 may be configured with a first CC (CC1) and a second CC (CC2). Additionally, in the example of FIG. 5, six receiver chains 500 (for example, group of receiver chains 500) may be available at the UE 120. Aspects of the present disclosure are not limited to the UE 120 supporting six receiver chains 500. Additional, or fewer, receiver chains may be supported. For brevity, only one receiver chain 500 is labeled in the example of FIG. 5. A first number of receiver chains, from the six receiver chains 500, may be allocated to the first CC, and a second number of receiver chains, from the six receiver chains 500, may be allocated to the second CC. Each receiver chain is either a hard-wired receiver chain or a time-shared digital processing receiver chain. Additionally, each receiver chain may be associated with one or more antennas 252, an LNA 502, an ADC 505, and a digital demodulator 506.

In the example of FIG. 5, the UE 120 may allocate, to each CC of the group of CCs (CC1 and CC2), a first number of receiver chains or a second number of receiver chains to maximize a total throughput for decoding the group of CCs, collectively. In the example of FIG. 5, the UE 120 allocates four antennas 252 to the first CC, thereby increasing a throughput of the first CC by 20 Mbps. Additionally, the UE 120 may allocate two antennas 252 to the second CC, thereby increasing a throughput of the second CC by 10 Mbps. The UE 120 may then decode, at a decoding block 510, each of the CCs (CC1 and CC2) based on the first number of receiver chains or the second number of receiver chains allocated to the CC.

In some other examples, the UE 120 may allocate a first number of receiver chains to each component carrier (CC) of a first subset of CCs, of a group of CCs, currently associated with a second number of receiver chains. Additionally, in such examples, the UE 120 may allocate a second number of receiver chains to each CC of a second subset of CCs, of the group of CCs, currently associated with a first number of receiver chains. The UE 120 may allocate the first number of receiver chains and the second number of receiver chains based on a throughput gain being greater than a throughput loss. The throughput gain is associated with switching each CC of the first subset of CCs to the first number of receiver chains. The throughput loss is associated with switching each CC of the second subset of CCs to the second number of receiver chains. In such examples, each of the first number of receiver chains and the second number of receiver chains may be selected from a group of receiver chains associated with the UE 120. Each receiver chain may be an example of a receiver chain 400 or 500 described with reference to FIGS. 4 and 5, respectively. Additionally, the first number of receiver chains may be different than the second number of receiver chains. The UE 120 may decode each CC of the group of CCs based on the first number of receiver chains or the second number of receiver chains allocated to the CC.

In such examples, prior to allocating the first number of receiver chains and the second number of receiver chains, the UE 120 may determine, for each CC of the first subset of CCs, a first throughput associated with decoding the CC using the first number of receiver chains and a second throughput associated with decoding the CC using the second number of receiver chains. The throughput gain may be based on a difference between a sum of the first throughputs, for the first subset of CCs, and a sum of the second throughputs, for the first subset of CCs. Specifically, the UE 120 may determine the throughput gain based on switching each CC of a first subset of CCs currently associated with the second number of receiver chains to the first number of receiver chains.

Additionally, the UE 120 may determine, for each CC in the second subset of CCs, a third throughput associated with decoding the CC using the second number of receiver chains and a fourth throughput associated with decoding the CC using the first number of receiver chains. The throughput loss may be based on a difference between a sum of the third throughputs, for the second subset of CCs, and a sum of the fourth throughputs, for the second subset of CCs. Specifically, the UE 120 may determine the throughput loss based on switching each CC of the second subset of CCs currently associated with the first number of receiver chains to the second number of receiver chains.

In some examples, the first throughput, the second throughput, the third throughput, and the fourth throughput may be based on one or both of a current amount of network traffic or current channel conditions. The current amount of network traffic may be based on one or more of a modulation and coding scheme (MCS), slot allocation, or another type of network traffic measurement. Additionally, the current channel conditions may be based on one or more of a signal-to-noise ratio, a reference signal measurement, or another type of channel condition measurement.

Figure 6:
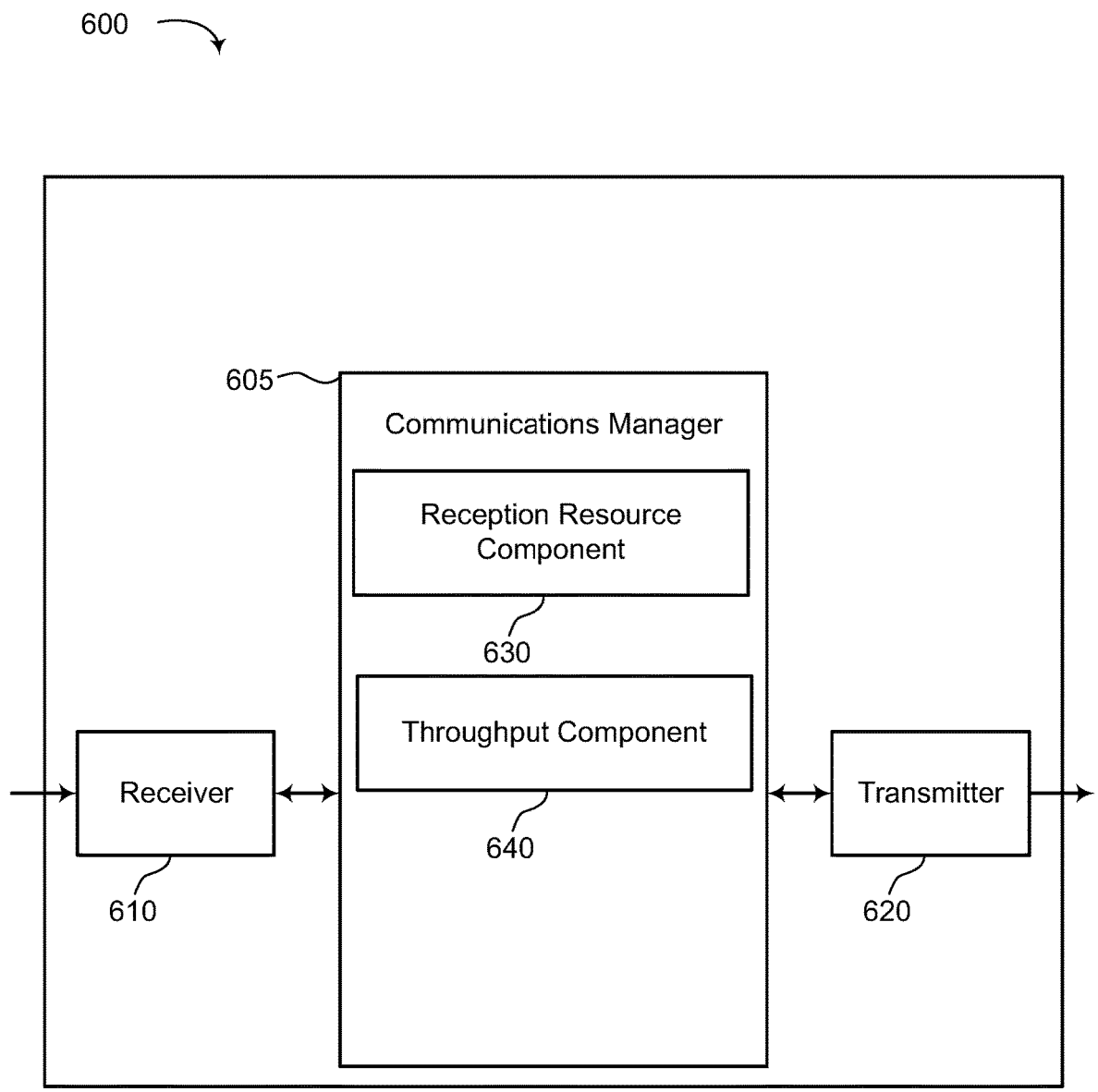
FIG. 6 is a block diagram illustrating an example wireless communication device that supports dynamically allocating receiver chains, in accordance with some aspects of the present disclosure.

FIG. 6 is a block diagram illustrating an example wireless communication device 600 that supports dynamically allocating receiver chains, in accordance with some aspects of the present disclosure. The device 600 may be an example of aspects of a UE 120 described with reference to FIGS. 1, 2, and 3. The wireless communication device 600 may include a receiver 610, a communications manager 605, a transmitter 620, a reception resource component 630 and a throughput component 640 which may be in communication with one another (for example, via one or more buses). In some examples, the wireless communication device 600 is configured to perform operations, including operations of the processes 700, 800, and 900 described below with reference to FIGS. 7, 8, and 9, respectively.

In some examples, the wireless communication device 600 can include a chip, chipset, package, or device that includes at least one processor and at least one modem (for example, a 5G modem or other cellular modem). In some examples, the communications manager 605, or its subcomponents, may be separate and distinct components. In some examples, at least some components of the communications manager 605 are implemented at least in part as software stored in a memory. For example, portions of one or more of the components of the communications manager 605 can be implemented as non-transitory code executable by the processor to perform the functions or operations of the respective component.

The receiver 610 may receive one or more reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH), physical uplink control channel (PUCCH), or physical sidelink control channel (PSCCH) and data channels (for example, a physical downlink shared channel (PDSCH), physical sidelink shared channel (PSSCH), a physical uplink shared channel (PUSCH)). The other wireless communication devices may include, but are not limited to, a base station 110 as described with reference to FIGS. 1 and 2, a CU 310, DU 330, or RU 340 as described with reference to FIG. 3.

The received information may be passed on to other components of the device 600. The receiver 610 may be an example of aspects of the receive processor 258 described with reference to FIG. 2. The receiver 610 may include a set of radio frequency (RF) chains that are coupled with or otherwise utilize a set of antennas (for example, the set of antennas may be an example of aspects of the antennas 252 described with reference to FIG. 2).

The transmitter 620 may transmit signals generated by the communications manager 605 or other components of the wireless communication device 600. In some examples, the transmitter 620 may be collocated with the receiver 610 in a transceiver. The transmitter 620 may be an example of aspects of the transmit processor 264 described with reference to FIG. 2. The transmitter 620 may be coupled with or otherwise utilize a set of antennas (for example, the set of antennas may be an example of aspects of the antennas 252 described with reference to FIG. 2), which may be antenna elements shared with the receiver 610. In some examples, the transmitter 620 is configured to transmit control information in a PUCCH, PSCCH, or PDCCH and data in a physical uplink shared channel (PUSCH), PSSCH, or PDSCH.

The communications manager 605 may be an example of aspects of the controller/processor 280 described with reference to FIG. 2. The communications manager 605 may include the reception resource component 630 and the throughput component 640. In some examples, working in conjunction with the receiver 610, the reception resource component 630 may, receive from a network node, a message configuring a group of CCs. Working in conjunction with the receiver 610, the reception resource component 630 may allocate, to each CC of the group of CCs based on receiving the message configuring the group of CCs, one of a respective first number of receiver chains, from a group of receiver chains available at the UE, or a respective second number of receiver chains, from the group of receiver chains, to maximize a total number of receiver chains actively used for decoding the group of CCs, collectively. Additionally, working in conjunction with the reception resource component 630 and the receiver 610, the wireless communication device 600 may decode each CC of the group of CCs based on the respective first number of receiver chains or the respective second number of receiver chains allocated to the CC.

In some examples, working in conjunction with the receiver 610, the throughput component 640 may detect an event associated with a wireless communication channel and then allocate, to each CC of a group of CCs based on detecting the event, one of a respective first number of receiver chains, from a group of receiver chains available at the UE, or a respective second number of receiver chains, from the group of receiver chains, to maximize a total throughput for decoding the group of CCs collectively. Additionally, working in conjunction with the throughput component 640 and the receiver 610, the wireless communication device 600 may decode each CC of the group of CCs based on the respective first amount of receiver chains or the respective second amount of receiver chains allocated to the CC.

In some examples, working in conjunction with the receiver 610, the throughput component 640 may detect an event associated with a wireless communication channel and then allocate, in response to detecting the event, a respective first number of receiver chains from a group of receiver chains available at the UE to each CC of a first subset of CCs, of a group of CCs, currently associated with a respective second number of receiver chains from the group of receiver chains, and a respective second number of receiver chains from the group of receiver chains to each CC of a second subset of CCs, of the group of CCs, currently associated with a respective first number of receiver chains from the group of receiver chains, based on a throughput gain associated with switching each CC of the first subset of CCs to the respective first number of receiver chains being greater than a throughput loss associated with switching each CC of the second subset of CCs to the respective second number of receiver chains. Additionally, working in conjunction with the throughput component 640 and the receiver 610, the wireless communication device 600 may decode each CC of the group of CCs based on the respective first number of receiver chains or the respective second number of receiver chains allocated to the CC.

FIG. 7 is a flow diagram illustrating an example process 700 performed by a UE 120, in accordance with some aspects of the present disclosure. The example process 700 is an example of a dynamically allocating receiver chains. As shown in FIG. 7, the process 700 begins at block 702 by receiving from a network node, a message configuring a group of CCs. At block 704, the process 700 allocates, to each CC of the group of CCs based on receiving the message configuring the group of CCs, one of a respective first number of receiver chains, from a group of receiver chains available at the UE, or a respective second number of receiver chains, from the group of receiver chains, to maximize a total number of receiver chains actively used for decoding the group of CCs, collectively. At block 706, the process 700 decodes each CC of the group of CCs based on the respective first number of receiver chains or the respective second number of receiver chains allocated to the CC.

Figure 8:
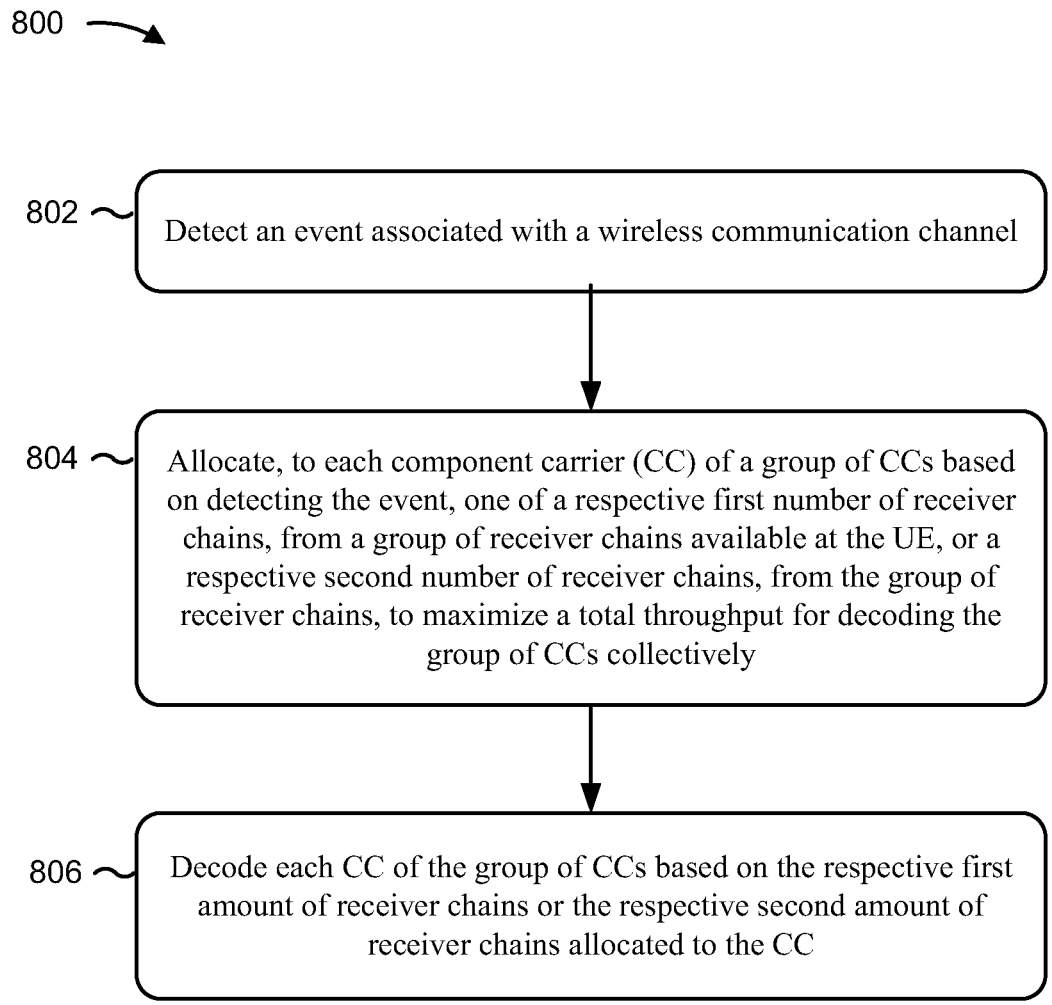
FIG. 8 is a flow diagram illustrating an example process performed by a UE that supports dynamically allocating receiver chains, in accordance with some aspects of the present disclosure.

FIG. 8 is a flow diagram illustrating an example process 800 performed by a UE 120, in accordance with some aspects of the present disclosure. The example process 800 is an example of a dynamically allocating receiver chains. As shown in FIG. 8, the process 800 begins at block 802 by detecting an event associated with a wireless communication channel. In some examples, the event may be a change in a traffic pattern on the wireless communication channel and/or a change in channel condition of the wireless communication channel. The event may be detected by monitoring the wireless communication channel between the UE and a network node (or another wireless communication device). At block 804, the process allocates, to each CC of a group of CCs based on detecting the event, one of a respective first number of receiver chains, from a group of receiver chains available at the UE, or a respective second number of receiver chains, from the group of receiver chains, to maximize a total throughput for decoding the group of CCs collectively. At block 806, the process 800 decode each CC of the group of CCs based on the respective first amount of receiver chains or the respective second amount of receiver chains allocated to the CC.

FIG. 9 is a flow diagram illustrating an example process 900 performed by a UE 120, in accordance with some aspects of the present disclosure. The example process 900 is an example of a dynamically allocating receiver chains. As shown in FIG. 9, the process 900 begins at block 902 by detecting an event associated with a wireless communication channel. In some examples, the event may be a change in a traffic pattern on the wireless communication channel and/or a change in channel condition of the wireless communication channel. The event may be detected by monitoring the wireless communication channel between the UE and a network node (or another wireless communication device). At block 904, the process 900 allocates, in response to detecting the event, a respective first number of receiver chains from a group of receiver chains available at the UE to each CC of a first subset of CCs, of a group of CCs, currently associated with a respective second number of receiver chains from the group of receiver chains, and a respective second number of receiver chains from the group of receiver chains to each CC of a second subset of CCs, of the group of CCs, currently associated with a respective first number of receiver chains from the group of receiver chains, based on a throughput gain associated with switching each CC of the first subset of CCs to the respective first number of receiver chains being greater than a throughput loss associated with switching each CC of the second subset of CCs to the respective second number of receiver chains. At block 906, the process 900 decode each CC of the group of CCs based on the respective first number of receiver chains or the respective second number of receiver chains allocated to the CC.

Implementation examples are described in the following numbered clauses:

Clause 1. A method for wireless communication by a UE, receiving, from a network node, a message configuring a group of component carriers (CCs); allocating, to each CC of the group of CCs based on receiving the message configuring the group of CCs, one of a respective first number of receiver chains, from a group of receiver chains available at the UE, or a respective second number of receiver chains, from the group of receiver chains, to maximize a total number of receiver chains actively used for decoding the group of CCs, collectively; and decoding each CC of the group of CCs based on the respective first number of receiver chains or the respective second number of receiver chains allocated to the CC.

Clause 2. The method of Clause 1, wherein: the respective second number of receiver chains is allocated to each CC of a first subset of CCs, of the group of CCs, based on a respective first amount of reception resources for decoding the CC in the first subset of CCs being greater than a respective second amount of reception resources for decoding each CC of a second subset of CCs, of the group of CCs: the respective first number of receiver chains is allocated to each CC of the second subset CCs; and each CC of the group of CCs is included in one of the first subset of CCs or the second subset of CCs.

Clause 3. The method of any one of Clauses 1-2, further comprising activating or deactivating one or more CCs of the group of CCs based on receiving the message configuring the group of CCs.

Clause 4. The method of any one of Clauses 1-3, further comprising re-configuring the group of CCs based on receiving the message configuring the group of CCs.

Clause 5. The method of any one of Clauses 1-4, wherein: each receiver chain in the group of receiver chains is one of a hard-wired receiver chain or a time-shared digital processing receiver chain; and each receiver chain in the group of receiver chains includes one or more of an antenna, a radio frequency (RF)/analog amplifier, a mixer, an RF/analog filter, an analog-to-digital convertor (ADC), a down converter, a digital processor, or a digital demodulator.

Clause 6. The method of any one of Clauses 1-5, wherein one or both of the respective first number of receiver chains or the respective second number of receiver chains are: greater than or equal to a minimum number of receiver chains supported by the UE; and less than or equal to a maximum number of receiver chains supported by the UE.

Clause 7. A method for wireless communication by a UE, comprising: detecting an event associated with a wireless communication channel: allocating, to each CC of a group of CCs based on detecting the event, one of a respective first number of receiver chains, from a group of receiver chains available at the UE, or a respective second number of receiver chains, from the group of receiver chains, to maximize a total throughput for decoding the group of CCs collectively; and decoding each CC of the group of CCs based on the respective first amount of receiver chains or the respective second amount of receiver chains allocated to the CC.

Clause 8. The method of Clause 7, wherein each receiver chain in the group of receiver chains is a hard-wired receiver chain or a time-shared digital processing receiver chains.

Clause 9. The method of any one of Clauses 7-8, wherein each receiver chain in the group of receiver chains includes one or more of an antenna, an RF/analog amplifier, a mixer, an RF/analog filter, an analog-to-digital convertor (ADC), a down converter, a digital processor, or a digital demodulator.

Clause 10. The method of any one of Clauses 7-9, further comprising determining, for each CC of the group of CCs, a respective first set of throughputs associated with decoding the CCs using the respective first number of receiver chains and a respective second set of throughputs associated with decoding the CCs using the respective second number of receiver chains, wherein both the respective first set of throughputs and the respective second set of throughputs are based on one or both of a current amount of network traffic or current channel conditions.

Clause 11. The method of Clause 10, wherein the current amount of network traffic is based on one or both of a modulation and coding scheme or a number of modulation symbols.

Clause 12. The method of Clause 10, wherein the current channel conditions are based on one or both of a signal-to-noise ratio or a reference signal measurement.

Clause 13. The method of any one of Clauses 7-12, wherein the event is a change in a traffic pattern on the wireless communication channel and/or a change in channel condition of the wireless communication channel.

Clause 14. A method for wireless communication by a UE, comprising: detecting an event associated with a wireless communication channel: allocating, in response to detecting the event, a respective first number of receiver chains from a group of receiver chains available at the UE to each CC of a first subset of CCs, of a group of CCs, currently associated with a respective second number of receiver chains from the group of receiver chains, and a respective second number of receiver chains from the group of receiver chains to each CC of a second subset of CCs, of the group of CCs, currently associated with a respective first number of receiver chains from the group of receiver chains, based on and a throughput gain associated with switching each CC of the first subset of CCs to the respective first number of receiver chains being greater than a throughput loss associated with switching each CC of the second subset of CCs to the respective second number of receiver chains; and decoding each CC of the group of CCs based on the respective first number of receiver chains or the respective second number of receiver chains allocated to the CC.

Clause 15. The method of Clause 14, wherein each receiver chain in the group of receiver chains is a hard-wired receiver chain or a time-shared digital processing receiver chains.

Clause 16. The method of any one of Clauses 14-15, wherein each receiver chain in the group of receiver chains includes one or more of an antenna, an RF/analog amplifier, a mixer, an RF/analog filter, an ADC, a down converter, a digital processor, or a digital demodulator.

Clause 17. The method of any one of Clauses 14-16, further comprising: determining, for each CC in the first subset of CCs, a first throughput associated with decoding the CC using the respective first number of receiver chains; and determining, for each CC in the first subset of CCs, a second throughput associated with decoding the CC using the respective second number of receiver chains, wherein the throughput gain is based on a difference between a sum of the respective first throughputs and a sum of the respective second throughputs.

Clause 18. The method of Clause 17, further comprising determining, for each CC in the second subset of CCs, a third throughput associated with decoding the CC using the respective first number of receiver chains; and determining, for each CC in the second subset of CCs, a fourth throughput associated with decoding the CC using the respective second number of receiver chains, wherein the throughput loss is based on a difference between a sum of the respective third throughputs and a sum of the respective fourth throughputs.

Clause 19. The method of Clause 18, wherein each one of the respective first throughputs, respective second throughputs, respective third throughputs, and respective fourth throughputs is based on one or both of a current amount of network traffic or current channel conditions.

Clause 20. The method of Clause 19, wherein the current amount of network traffic is based on one or both of a modulation and coding scheme or slot allocation.

Clause 21. The method of Clause 19, wherein the current channel conditions are based on one or both of a signal-to-noise ratio or a reference signal measurement.

Clause 22. The method of any one of Clauses 14-21, wherein the event is a change in a traffic pattern on the wireless communication channel and/or a change in channel condition of the wireless communication channel.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, or a combination of hardware and software. As used, a processor is implemented in hardware, firmware, or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems or methods described may be implemented in different forms of hardware, firmware, or a combination of hardware and software. The actual specialized control hardware or software code used to implement these systems or methods is not limiting of the aspects. Thus, the operation and behavior of the systems or methods were described without reference to specific software code—it being understood that software and hardware can be designed to implement the systems or methods based, at least in part, on the description.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, or the like), and may be used interchangeably with "one or more." Where only one item is intended, the phrase "only one" or similar language is used. Also, as used, the terms "has," "have," "having," or the like are intended to be open-ended terms. Further, the phrase "based on" is intended to mean "based, at least in part, on" unless explicitly stated otherwise.

What is claimed is:

1. A method for wireless communication by a user equipment (UE), comprising:
    receiving, from a network node, a message configuring a group of component carriers (CCs);
    adjusting a number of active CCs of the group of CCs in accordance with receiving the message;
    dynamically allocating, to each CC of the group of CCs based on adjusting the number of active CCs, one of a respective first number of receiver chains, from a group of receiver chains available at the UE, or a respective second number of receiver chains, from the group of receiver chains, a throughput gain associated with allocating the respective second number of receiver chains, to each CC of a first subset of CCs, of the group of CCs, being greater than a throughput loss associated with allocating the respective first number of receiver chains to each CC of a second subset of CCs, of the group of CCs, each CC of the group of CCs being included in one of the first subset of CCs or the second subset of CCs; and
    decoding each CC of the group of CCs based on the respective first number of receiver chains or the respective second number of receiver chains allocated to the CC.

2. The method of claim 1, wherein:
    the second number of receiver chains is greater than the first number of receiver chains.

3. The method of claim 1, wherein adjusting the number of active CCs of the group of CCs comprises activating or deactivating one or more CCs of the group of CCs based on receiving the message configuring the group of CCs.

4. The method of claim 1, wherein each receiver chain in the group of receiver chains is one of a hard-wired receiver chain or a time-shared digital processing receiver chain.

5. The method of claim 1, wherein each receiver chain in the group of receiver chains includes one or more of an antenna, a radio frequency (RF)/analog amplifier, a mixer, an RF/analog filter, an analog-to-digital convertor (ADC), a down converter, a digital processor, or a digital demodulator.

6. The method of claim 1, wherein one or both of the respective first number of receiver chains or the respective second number of receiver chains are:
    greater than or equal to a minimum number of receiver chains supported by the UE; and less than or equal to a maximum number of receiver chains supported by the UE.

7. An apparatus for wireless communications at a user equipment (UE), comprising:
    at least one processor; and
    at least one memory coupled with the at least one processor and storing instructions operable, when executed by the at least one processor, to cause the apparatus to:
        receive, from a network node, a message configuring a group of component carriers (CCs);
        adjust a number of active CCs of the group of CCs in accordance with receiving the message;
        dynamically allocate, to each CC of the group of CCs based on adjusting the number of active CCs, one of a respective first number of receiver chains, from a group of receiver chains available at the UE, or a respective second number of receiver chains, from the group of receiver chains, a throughput gain associated with allocating the respective second number of receiver chains, to each CC of a first subset of CCs, of the group of CCs, being greater than a throughput loss associated with allocating the respective first number of receiver chains to each CC of a second subset of CCs, of the group of CCs, each CC of the group of CCs being included in one of the first subset of CCs or the second subset of CCs; and decode each CC of the group of CCs based on the respective first number of receiver chains or the respective second number of receiver chains allocated to the CC.

8. The apparatus of claim 7, wherein:
the second number of receiver chain is greater than the first number of receiver chains.

9. The apparatus of claim 7, wherein execution of the instructions to cause the apparatus to adjust the number of active CCs of the group of CCs further cause the apparatus to activate or deactivating one or more CCs of the group of CCs based on receiving the message configuring the group of CCs.

10. The apparatus of claim 7, wherein each receiver chain in the group of receiver chains is one of a hard-wired receiver chain or a time-shared digital processing receiver chain.

11. The apparatus of claim 7, wherein each receiver chain in the group of receiver chains includes one or more of an antenna, a radio frequency (RF)/analog amplifier, a mixer, an RF/analog filter, an analog-to-digital convertor (ADC), a down converter, a digital processor, or a digital demodulator.

12. The apparatus of claim 7, wherein one or both of the respective first number of receiver chains or the respective second number of receiver chains are:
greater than or equal to a minimum number of receiver chains supported by the UE; and
less than or equal to a maximum number of receiver chains supported by the UE.

13. A method for wireless communication by a user equipment (UE), comprising:
receiving, from a network node, a message configuring a group of component carriers (CCs);
adjusting a number of active CCs of the group of CCs in accordance with receiving the message;
allocating, in response to adjusting the number of active CCs, a respective first number of receiver chains from a group of receiver chains available at the UE to each CC of a first subset of CCs, of a group of CCs, currently associated with a respective second number of receiver chains from the group of receiver chains, and a respective second number of receiver chains from the group of receiver chains to each CC of a second subset of CCs, of the group of CCs, currently associated with the respective first number of receiver chains from the group of receiver chains, based on a throughput gain associated with switching each CC of the first subset of CCs to the respective first number of receiver chains being greater than a throughput loss associated with switching each CC of the second subset of CCs to the respective second number of receiver chains; and
decoding each CC of the group of CCs based on the respective first number of receiver chains or the respective second number of receiver chains allocated to the CC.

14. The method of claim 13, wherein each receiver chain in the group of receiver chains is a hard-wired receiver chain or a time-shared digital processing receiver chains.

15. The method of claim 13, wherein each receiver chain in the group of receiver chains includes one or more of an antenna, a radio frequency (RF)/analog amplifier, a mixer, an RF/analog filter, an analog-to-digital convertor (ADC), a down converter, a digital processor, or a digital demodulator.

16. The method of claim 13, further comprising:
determining, for each CC in the first subset of CCs, a first throughput associated with decoding the CC using the respective first number of receiver chains; and
determining, for each CC in the first subset of CCs, a second throughput associated with decoding the CC using the respective second number of receiver chains, wherein the throughput gain is based on a difference between a sum of the respective first throughputs and a sum of the respective second throughputs.

17. The method of claim 16, further comprising:
determining, for each CC in the second subset of CCs, a third throughput associated with decoding the CC using the respective first number of receiver chains; and
determining, for each CC in the second subset of CCs, a fourth throughput associated with decoding the CC using the respective second number of receiver chains, wherein the throughput loss is based on a difference between a sum of the respective third throughputs and a sum of the respective fourth throughputs.

18. The method of claim 17, wherein each one of the respective first throughputs, respective second throughputs, respective third throughputs, and respective fourth throughputs is based on one or both of a current amount of network traffic or current channel conditions.

19. The method of claim 18, wherein the current amount of network traffic is based on one or both of a modulation and coding scheme or slot allocation.

20. The method of claim 18, wherein the current channel conditions are based on one or both of a signal-to-noise ratio or a reference signal measurement.

21. An apparatus for wireless communications at a user equipment (UE), comprising:
at least one processor; and
at least one memory coupled with the at least one processor and storing instructions operable, when executed by the at least one processor, to cause the apparatus to:
receive, from a network node, a message configuring a group of component carriers (CCs);
adjust a number of active CCs of the group of CCs in accordance with receiving the message;
allocate, in response to adjusting the number of active CCs, a respective first number of receiver chains from a group of receiver chains available at the UE to each CC of a first subset of CCs, of a group of CCs, currently associated with a respective second number of receiver chains from the group of receiver chains, and a respective second number of receiver chains from the group of receiver chains to each CC of a second subset of CCs, of the group of CCs, currently associated with the respective first number of receiver chains from the group of receiver chains, based on a throughput gain associated with switching each CC of the first subset of CCs to the respective first number of receiver chains being greater than a throughput loss associated with switching each CC of the second subset of CCs to the respective second number of receiver chains; and
decode each CC of the group of CCs based on the respective first number of receiver chains or the respective second number of receiver chains allocated to the CC.

22. The apparatus of claim 21, wherein each receiver chain in the group of receiver chains is a hard-wired receiver chain or a time-shared digital processing receiver chains.

23. The apparatus of claim 21, wherein each receiver chain in the group of receiver chains includes one or more of an antenna, a radio frequency (RF)/analog amplifier, a mixer, an RF/analog filter, an analog-to-digital convertor (ADC), a down converter, a digital processor, or a digital demodulator.

24. The apparatus of claim 21, further comprising:
determining, for each CC in the first subset of CCs, a first throughput associated with decoding the CC using the respective first number of receiver chains; and
determining, for each CC in the first subset of CCs, a second throughput associated with decoding the CC using the respective second number of receiver chains, wherein the throughput gain is based on a difference between a sum of the respective first throughputs and a sum of the respective second throughputs.

25. The apparatus of claim 24, wherein execution of the instructions further cause the apparatus to:
determine, for each CC in the second subset of CCs, a third throughput associated with decoding the CC using the respective first number of receiver chains; and
determine, for each CC in the second subset of CCs, a fourth throughput associated with decoding the CC using the respective second number of receiver chains, wherein the throughput loss is based on a difference between a sum of the respective third throughputs and a sum of the respective fourth throughputs.

26. The apparatus of claim 25, wherein each one of the respective first throughputs, respective second throughputs, respective third throughputs, and respective fourth throughputs is based on one or both of a current amount of network traffic or current channel conditions.

27. The apparatus of claim 21, wherein the current amount of network traffic is based on one or both of a modulation and coding scheme or slot allocation.

28. The apparatus of claim 21, wherein the current channel conditions are based on one or both of a signal-to-noise ratio or a reference signal measurement.

* * * * *